July 8, 1958 — E. C. CARLSON — 2,842,266
CONVEYING AND MATERIAL SEPARATING MECHANISM
Filed June 14, 1955 — 3 Sheets-Sheet 1

Inventor:
Ernest C. Carlson
Paul O. Pippel
Atty.

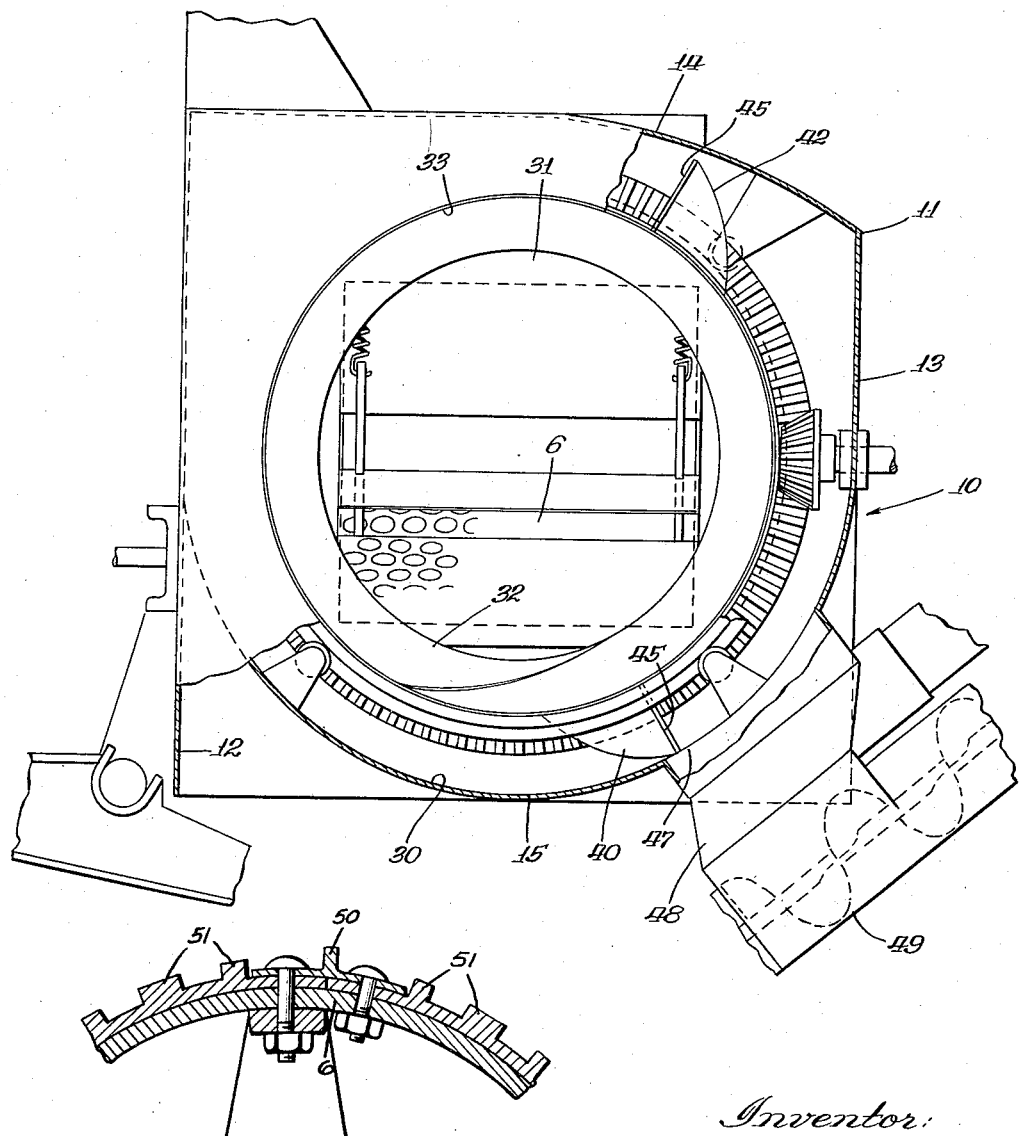

July 8, 1958 E. C. CARLSON 2,842,266
CONVEYING AND MATERIAL SEPARATING MECHANISM
Filed June 14, 1955 3 Sheets-Sheet 3
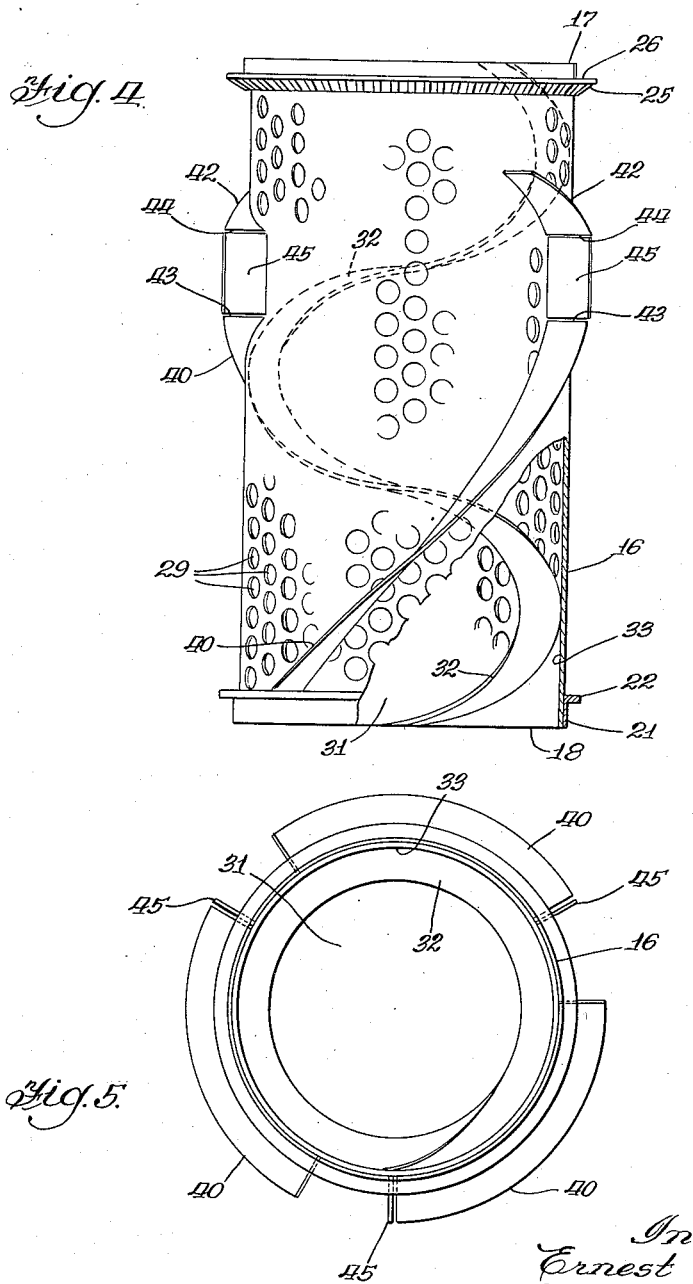
Inventor
Ernest C. Carlson United States Patent Office 2,842,266
Patented July 8, 1958

2,842,266

CONVEYING AND MATERIAL SEPARATING MECHANISM

Ernest C. Carlson, Wheaton, Ill., assignor to International Harvester Company, a corporation of New Jersey Application June 14, 1955, Serial No. 515,366

1 Claim. (Cl. 209—284)

This invention relates to conveyors and more specifically to novel conveying and sifting mechanism which is especially adapted, though not restricted, to use a sheller for separating the kernels from an aggregate of cobs, kernels and husks.

A general object of the invention is to provide a novel, efficient and simple combined conveying and separating mechanism which employs a minimum of moving parts.

A more specific object of the invention is to provide a novel drum type separator and conveyor of the type incorporating a perforated drum with an internal auger flight which is adapted to move the aggregate from its intake to its discharge ends attendant to tumbling the aggregate and sifting out desired material therefrom such as kernels of corn.

A more specific object of the invention is to provide a novel mechanism of the type under consideration which employs internal and external auger flights which are effective to remove the undesired trash, etc. from the material from which it is to be separated and wherein the external auger flight is arranged within an enclosing housing and effective to move the desired material to a point of discharge.

These and other objects of the invention will become more apparent from the specification and the drawings, wherein:

Figure 3 is an enlarged end view partially in vertical section taken substantially on the line 3—3 of Figure 2;

Figure 4 is a side view of the drum partially in longitudinal section;

Figure 5 is an end view of the drum; and

Figure 6 is an enlarged fragmentary transaxial section of the shelling cylinder.

Figure 1:
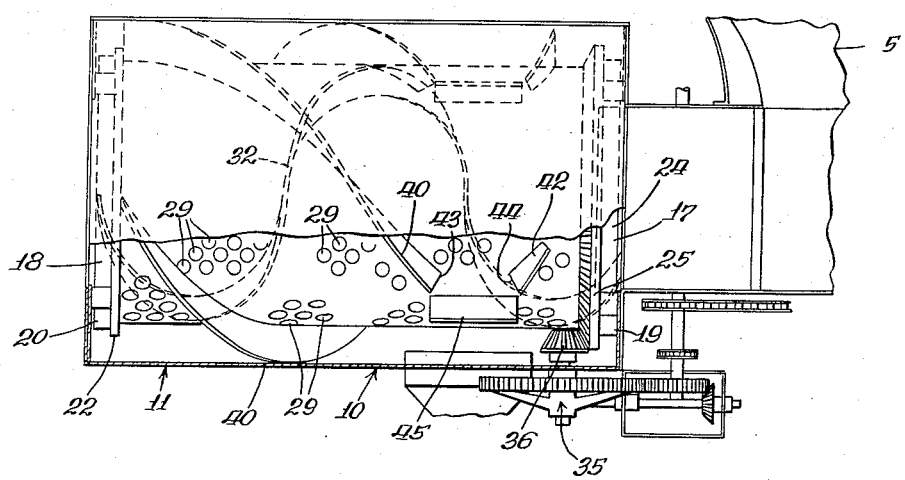
Figure 1 is a plan view of the novel mechanism shown partially broken away and in horizontal section.

The invention is shown in association with a shelling mechanism generally indicated 2 and which incorporates a shelling cage 3 having an intake 4 to a corn ear receiver in the form of a hopper 5, the hopper 5 communicating with the shelling cage 3 and the mechanism 2 incorporating a driven shelling cylinder 6. It will be understood that the shelling cylinder and hopper construction is not per se part of the invention and is claimed and more fully described in a copending U. S. application Serial No. 515,367 filed June 14, 1955, in the name of Ernest C. Carlson for Corn Sheller. Suffice it to say that the shelling mechanism 2 is located at one end of the combined cleaning and conveying mechanism generally designated 10 which incorporates a housing 11 having front and rear upright walls 12 and 13 and top and bottom walls 14 and 15, the bottom wall 15 being curved concentric with the axis of rotation of a cylindrical drum 16 which extends lengthwise of the housing 10 and at opposite ends 17 and 18 is rotatably supported on roller assemblies 19 and 20 which are carried by the walls of the housing 11 at a plurality of circumferentially spaced points. The drum 16 is provided with an imperforate track 21 at the end 18 disposed outwardly of a radially outwardly extending flange 22 formed interal with the outer periphery of the drum 16, the flange 22 preventing or limiting axial displacement of the drum 16 in a direction toward the roller assemblies which are disposed outwardly thereof and abutable with the outer side 23 of the flange 22 to limit such movement. The extremity 17 is also provided with an imperforate track 24 which cooperates with the before-mentioned roller assembly 19 and the inner edge of this track 24 is defined by a ring gear 25 which circumscribes the drum and formed integral or connected with the drum for rotation therewith. The gear 25 provides a radial edge 26 which faces toward the adjacent end of the drum and adapted to abut as at 27 against the adjacent roller assembly 19 to prevent endwise movement of the drum in that direction.

Figure 2:
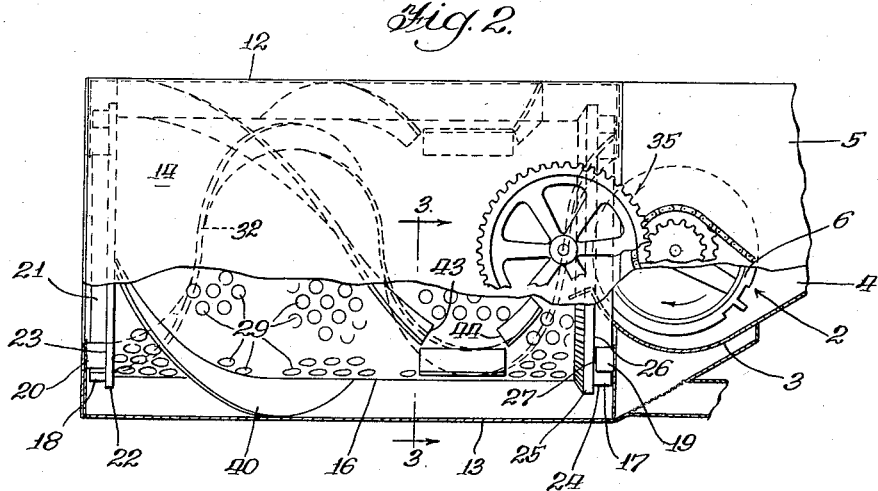
Figure 2 is a rear view of the structure shown in Figure 1 partially broken away and shown in vertical section.

It will be noted that the end 17 of the drum which may be termed the inlet or the receiving end is disposed in receiving relationship to the shelling mechanism 3, as best seen in Figures 2 and 3.

The drum 16 is perforated by a plurality of holes 29 about its entire circumferential extent through which material of predetermined size, such as kernels of corn, are adapted to sift through and discharge onto the concave surface 30 of the bottom wall 15 of the encompassing housing. It will be noted that the sifting operation is accompanied by a discharge of the unwanted material through the interior 31 of the drum by means of the auger flight 32 which is rigidly connected to the interior side 33 of the drum 16. It will be understood that the material will be kept gravitationally along the lower part of the drum and that rotation of the drum 16 through associated driving mechanism such as the gear train 35, which includes the bevel gear 36 cooperating with the ring bevel gear 25, will move the unwanted material from the intake end of the drum to the discharge end 18. It will be understood that the drum is positioned generally horizontally lengthwise and that it is provided on its external side with a series of circumferentially spaced reversely spiraled auger flights 40 and 42 which sweep over the surface 30 to thus move the grain from opposite ends of the housing to intremediate the ends thereof in between the adjacent ends 43 and 44 of the flights 40 and 42.

The intermediate portion of the drum is provided with a series of axially extending circumferentially spaced radially outwardly projecting paddles or sweepers 45 which are adapted to sweep over the bottom 30 and push the material which has been piled up in the path of its sweep into the bottom discharge opening 47 in wall 30 for discharge into hopper 48, and from there into the auger conveyor 49 which is adapted to discharge the material into an associated receptacle such as a wagon. It will be understood that the conveyor 49 is not per se part of the invention and is shown in an associated application Serial No. 508,349 filed May 16, 1955, which is now U. S. Patent No. 2,818,163, in the name of Samuel E. Hilblom, et al. for Recirculating Conveyor wherein it is claimed.

It will be appreciated that the walls of the housing which confine the auger drum are perforated and that the flights of the auger create an air disturbance which forces air currents through the drum to assist in agitating the material. Furthermore the shelling cylinder is positioned crosswise of the inlet end of the drum and produces an air blast axially of the drum through rotation as indicated by the arrow in Fig. 2 thus further assisting in fluffing the material and moving it axially through the drum. This is accomplished by the breaker bar 50 and the projections 51 on the periphery of the cylinder 6 as best seen in Figure 6.

What is claimed is:

In a combined sheller, conveyor and separator, a housing having an arcuate bottom, a perforated drum rotatably supported within said housing and having an inlet and an outlet and adapted to receive unclassified material at said inlet and discharge it from the outlet, an internal auger flight connected to said drum and projecting radially inwardly from the inner periphery thereof and extending from said inlet to said outlet, said drum having reversely spiralled external auger flights at opposite ends and terminating at adjacent ends intermediate the ends of said drum and in sweeping relation to said bottom for moving to intermediate the ends of the drum the material sifted onto said bottom through said perforation in the drum, a concave cage disposed tangentially to said inlet and having a discharge extremity contiguous to said inlet in substantially centered relation thereto, and a shelling cylinder cooperatively associated with said cage and extending transversely of the drum and positioned within said cage to throw the material directly into said drum axially thereof and formed and arranged to create an air blast directly into said drum, said cylinder rotating at high peripheral speed.

References Cited in the file of this patent

UNITED STATES PATENTS

| | | |
|---|---|---|
| 23,965 | Vaughn | May 10, 1859 |
| 938,139 | Gottshall | Oct. 26, 1909 |
| 1,907,344 | Climer | May 2, 1933 |